United States Patent Office 3,031,448
Patented Apr. 24, 1962

3,031,448
BUTYROLACTONE DERIVATIVES
Hans Willi Zimmer, Cincinnati, Ohio, and James M. Holbert, Lookout Mountain, Tenn., assignors to The Chattanooga Medicine Company, Chattanooga, Tenn., a corporation of Tennessee
No Drawing. Filed July 14, 1958, Ser. No. 748,173
1 Claim. (Cl. 260—240.6)

The instant invention relates to novel organic compounds, and more particularly, to novel butyrolactone derivatives.

Although the compounds of the invention may have a number of uses in various fields, they are particularly useful as pharmaceutical compounds and/or chemical intermediates in the synthesis of pharmaceutical compounds. The compounds of the invention may function as a uterine depressant and anti-spasmodic for smooth muscle.

In addition, the compounds of the invention may display antibacterial activity comparable to that of the well known sulfa drugs, sulfanilamide and sulfadiazine. In this respect, it should be noted that certain bacteria such as *Streptococcus pyogenes, Micrococcus pyogenes,* and *Escherichia coli* tend to become resistant to the known sulfa drugs, although they may be particularly sensitive to a new drug. It is believed that exposure of such bacteria to known sulfa drugs often tends to result in the survival of a strain resistant to such drugs, but still sensitive to a new drug to which the strain has not yet been exposed. There is thus a great need for new compounds which display antibacterical activity.

It is, therefore, an important object of the instant invention to provide new and useful butyrolactone derivatives.

Other and further objects, features and advantages of the present invention will become apparent to those skilled in the art from the following detailed disclosure thereof.

The instant invention consists in a compound having the formula:

$$AX-R-(R')_n$$

wherein X is a $C_1$ to $C_4$ hydrocarbon group, R is selected from the class consisting of furyl and phenyl radicals, $n$ is an integer from 1 to 2, R' is selected from the class consisting of H and $C_1-C_4$ alkyl radicals, and A is selected from the class consisting of

and

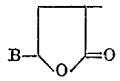

wherein B is selected from the class consisting of —H and —$CH_3$, the total number of C's in X and $(R')_n$ being at least 3.

In general, the compounds of the invention are alpha substituted gamma-butyrolactones. The gamma-butyrolactone ring has the following formulae:

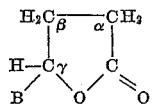

or

wherein B is H or $CH_3$. Strictly speaking the compound is gamma-valerolactone when B is $CH_3$, but this compound is also gamma-(methyl)-gamma-butyrolactone. The compounds of the invention are substituted at the alpha position on the butyrolactone ring.

The compounds of the instant invention are alpha substituted butyrolactones wherein the alpha substituent contains a cyclic group such as the phenyl group or the furyl group. Such cyclic member has an aliphatic radical connecting it to the butyrolactone ring and it may have alkyl substituents.

Certain alpha substituted butyrolactones, and their methods of preparation, are known. For example, Losanitsch (Monatsh., 35, 311, 1914) discloses alpha-(benzal)-gamma-valerolactone:

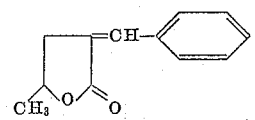

German Patent No. 844,292 of 1944 discloses alpha-(benzal)-gamma-butyrolactone:

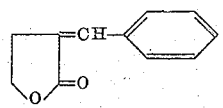

which is now a commerically available compound. The German patent discloses the condensation of butyrolactone with benzaldehyde to produce the above compound and further discloses the hydrogenation thereof to produce alpha-(benzyl)-gamma-butyrolactone:

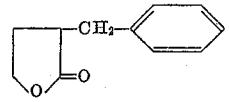

Also, the German patent discloses alpha-(furfural)-gamma-butyrolactone:

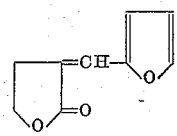

It has been found that the condensation reaction of said German patent is not operative with a number of substituted benzaldehydes. We have found, however, that the condensation of butyrolactone can be carried out successfully using certain aldehydes containing benzene or furyl nuclei, with certain hydrocarbon substituents. The resulting products may be hydrogenated at the alpha-exo double bond.

In general, the condensation reactions of the instant invention are carried out by dissolving a charge of 0.1 mol of the aldehyde and 0.2 mol of gamma-butyrolactone or gamma-valerolactone in 50 to 200 ml. of a suitable inert solvent such as benzene. With stirring, 0.15 mol of sodium methylate is added gradually at relatively cool reaction temperatures of room temperature or less and stirring is continued at such cool temperatures for a period of several hours. In the case of certain aldehydes which are usually oxidized, a nitrogen atmosphere is maintained over the reaction mixture. In most cases, the reaction mixture is ultimately heated in a water bath at a temperature of about 60–65° C. at the end of the cool reaction. The reaction mixture is then decomposed with an amount of 10% aqueous sulfuric acid sufficient to acidify the reaction mixture to effect relactonization. The product then precipitates and can be filtered off and may be recrystallized for purification.

Hydrogenation of the alpha-exo double bond is carried out under mild hydrogenation conditions. For example, 2 to 20 grams of the condensation product is dissolved in 250 ml. of methanol. About 5 to 10% of the weight of the condensation product of platinum dioxide is added and the reaction mixture is shaken under 45–50 pounds of hydrogen in a Parr apparatus until the pressure remains constant. This may require 15 minutes to 24 hours depending upon the amount of starting material used. The catalyst is then removed by filtration, the solvent distilled off and the residue further purified by recrystallization or distillation.

The compounds of the invention include:

Gamma-butyrolactone condensate of p-isopropylbenzaldehyde:

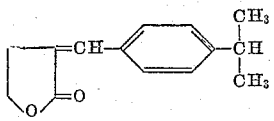

Gamma-valerolactone condensate of p-ethylbenzaldehyde:

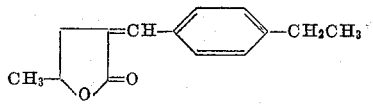

Gamma-butyrolactone condensate of p-tert.-butylbenzaldehyde:

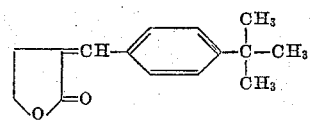

Gamma-butyrolactone condensate of 2,4-dimethylbenzaldehyde:

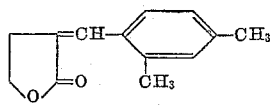

Gamma-valerolactone condensate of cinnamaldehyde:

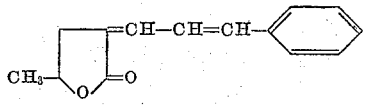

Gamma-butyrolactone condensate of 2,4-dimethylcinnamaldehyde:

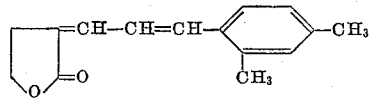

Gamma-valerolactone condensate of furacrolein:

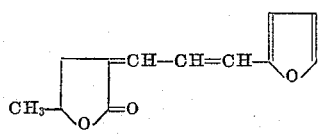

Gamma-butyrolactone condensate of 4,5-dimethyl-2-furfuraldehyde:

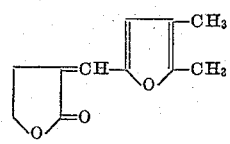

Gamma-butyrolactone condensate of phenylcrotonaldehyde:

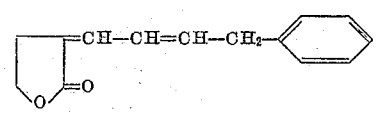

Gamma-butyrolactone condensate of 5-methylfuracrolein:

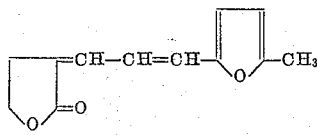

The compounds of the invention also include the hydrogenated derivatives of the above identified compounds. For example, the preferred compound listed herein is alpha-(p-isopropylbenzal)-butyrolactone; and this compound is hydrogenated at the alpha-exo double bond by the procedure previously described so as to obtain alpha-(p-isopropylbenzyl)butyrolactone.

Example 1

The apparatus used consists of a 500 milliliter three neck flask fitted with a stirrer, reflux condenser, thermometer and nitrogen inlet tube. A charge of 0.1 mol of p-isopropylbenzaldehyde and 0.2 mol of butyrolactone is dissolved in 100 ml. of benzene. With stirring, the reaction mixture is cooled down to approximately 0° C. in an ice-salt bath; and an atmosphere of nitrogen is maintained over the reaction mixture. Over a period of about 15 minutes, 0.15 mol of sodium methylate is added to the reaction mixture incrementally. With continued stirring and cooling, the reaction mixture reaches approximately room temperature and thickens, whereupon an additional 100 ml. of benzene is added, and stirring is continued for 4½ hours. Next, sufficient 10% aqueous sulfuric acid is added with stirring to make the reaction mixture acidic; and stirring is continued for 1 hour and the precipitate which is formed is filtered and washed thoroughly with water. This precipitate is recrystallized from dry ethyl ether and from petroleum ether (boiling point 40–60° C.) to obtain a 62% yield of white crystals melting at 65–66° C. Elemental analysis for alpha-(p-isopropylbenzal)-butyrolactone: calculated for $C_{14}H_{16}O_2$ is C=77.74, H=7.46; and found: C=75.01, H=7.12. This compound produces a uterine sedative action of about ⅔ that of papaverine.

Example 2

A charge of 5 grams of alpha-(p-isopropylbenzal)-butyrolactone is added to 250 ml. of methanol, to which is also added 0.5 gram of platinum dioxide, in a Parr apparatus, which is shaken under 45–50 pounds of hydrogen until the pressure remains constant. The catalyst is then removed by filtration, and the solvent distilled off. The product may be recrystallized. The instant product is alpha-(p-isopropylbenzyl)-butyrolactone in the form of a clear oily liquid boiling at 138–140° C. at 5 mm. Hg. Elemental analysis for this product: calculated for $C_{14}H_{18}O_2$ is C=77.03, H=8.31; and found: C=76.69, H=8.48. This compound exhibits a uterine sedative action of about ⅕ that of papaverine and exhibits unusual antibacterial activity with respect to *Micrococcus pyogenes*.

Example 3

A procedure is carried out that is the same as that of Example 1, except that the aldehyde used is cinnamaldehyde, and the reaction time at room temperature is only ½ hour. Alpha-cinnamal-butyrolactone is the product obtained in the form of white amorphous material melting at 133.5–135° C., and this product is recrystallized from methanol. Elemental analysis for alpha-cinnamal-butyrolactone: calculated for $C_{13}H_{12}O_2$ is C=77.98, H=6.04; and found: C=77.73, H=6.26. This compound exhibits a uterine sedative action of about ⅒ that of papaverine.

Example 4

A procedure is carried out that is the same as that of example 2, except that the butyrolactone derivative used is alpha-cinnamal-butyrolactone, and the resulting product is alpha-(3-phenyl-1-propyl)-butyrolactone which is obtained in the form of a colorless oily liquid boiling at 145–146° C. at 4 mm. Hg. This compound exhibits unusual antibacterial activity with respect to *Streptococcus pyogenes*.

Example 5

A procedure is carried out that is the same as that of Example 1, except that the aldehyde used is furacrolein, the reaction is carried out at room temperature for 1 hour and then the reaction mixture is heated in a water bath at 60–65° C. for 1 hour, before the treatment with dilute sulfuric acid, and the resulting alpha-(1-(2-furyl)-1-propenylidene-3)-butyrolactone which is recrystallized from ethanol to obtain a yield of 62% of yellow crystals melting at 98–99° C. Elemental analysis for this product: calculated for $C_{11}H_{10}O_3$ is C=69.46, H=5.30; and found: C=69.33, H=5.36. This compound exhibits a uterine sedative action of about ⅓ that of papaverine.

Example 6

A procedure is carried out that is the same as that of Example 2, except that the butyrolactone derivative used is alpha - (1-(2-furyl)-1-propenylidene-3) - butyrolactone, and the resulting product is alpha-(3-(tetrahydrofuryl-2)-propyl-1)-butyrolactone in the form of a yellow oily liquid boiling at 150–152° C. at 5 mm. Hg. Elemental analysis for this compound: calculated for $C_{11}H_{18}O_3$ is C=66.64, H=9.15; and found: C=66.35, H=8.98.

Example 7

The gamma-valerolactone homologues of the compounds formed in Examples 1, 3 and 5 are prepared by substituting gamma-valerolactone for the butyrolactone in the procedures of each of these examples.

The resulting gamma-valerolactone derivatives are hydrogenated at the alpha-exo double bond by carrying out the procedures of Examples 2, 4 and 6, respectively.

In addition, corresponding derivatives of gamma-valerolactone or butyrolactone are obtained by carrying out the condensation reaction of Example 1 using, as the aldehyde starting material, p-ethylbenzaldehyde, p-tert.-butylbenzaldehyde, 2,4 - dimethylbenzaldehyde, 2,4 - dimethylcinnamaldehyde, 4,5 - dimethyl - 2-furfuraldehyde, phenylcrotonaldehyde and 5-methylfuracrolein. Each of these compounds is also hydrogenated at the alpha-exo double bond by carrying out the hydrogenation procedure of Example 2.

It will be understood that modifications and variations may be effected without departing from the spirit and scope of the novel concepts of the present invention.

We claim as our invention:

Alpha - (1 - (2 - furyl) - 1 - propenylidene - 3) - butyrolactone.

References Cited in the file of this patent

FOREIGN PATENTS 844,292    Germany _____ July 17, 1952

OTHER REFERENCES

Losanitsch: "Chem. Abst.," 8, pages 2364–5 (1914).
Darzens et al.: "Chem. Abst.," 21, page 1646[2] (1927).
Darzens et al.: Comptes Rendus, vol. 184, pages 33 to 34 (1927).
Brooker et al.: Journal of the American Chemical Society, vol. 63, pages 3192 to 3193 (1941).
Marrian et al.: Biochemical Journ., vol. 45, pages 533 to 537 (1949).
Russell et al.: Biochemical Journal, vol. 45, pages 530–532 (1949).